(12) United States Patent
Masukake et al.

(10) Patent No.: US 10,221,804 B2
(45) Date of Patent: Mar. 5, 2019

(54) FUEL INJECTION CONTROL DEVICE

(71) Applicant: HONDA MOTOR CO., LTD., Tokyo (JP)

(72) Inventors: Yuichi Masukake, Wako (JP); Koichiro Shinozaki, Wako (JP); Nobuyuki Fujioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 15/414,622

(22) Filed: Jan. 25, 2017

(65) Prior Publication Data

US 2017/0226955 A1    Aug. 10, 2017

(30) Foreign Application Priority Data

Feb. 9, 2016    (JP) .................. 2016-022535

(51) Int. Cl.
*F02D 41/26* (2006.01)
*F02D 41/30* (2006.01)
*F02D 41/40* (2006.01)
*F02D 41/00* (2006.01)

(52) U.S. Cl.
CPC .......... *F02D 41/401* (2013.01); *F02D 41/26* (2013.01); *F02D 41/3094* (2013.01); *F02D 41/0007* (2013.01); *F02D 2200/0602* (2013.01); *F02D 2200/0618* (2013.01); *F02D 2200/101* (2013.01); *Y02T 10/44* (2013.01)

(58) Field of Classification Search
CPC .... F02D 41/26; F02D 41/3094; F02D 41/401; F02D 2200/0602; F02D 2200/0618
See application file for complete search history.

(56) References Cited

U.S. PATENT DOCUMENTS

2004/0149253 A1* 8/2004 Kikuchi .................. F02D 37/02
                                                              123/295
2009/0084356 A1* 4/2009 Nakata ................ F02D 41/2464
                                                              123/447
2009/0177372 A1* 7/2009 Akita .................... F02M 59/366
                                                              701/113

(Continued)

FOREIGN PATENT DOCUMENTS

JP    2003-013784    1/2003

*Primary Examiner* — Stephen K Cronin
*Assistant Examiner* — Anthony L Bacon
(74) *Attorney, Agent, or Firm* — Mori & Ward, LLP (57) ABSTRACT

A fuel injection control device for an internal combustion engine, includes a fuel pressure sensor and circuitry. The fuel pressure sensor detects an actual fuel pressure of the fuel supplied to a cylinder fuel injection valve. The circuitry calculates a demanded amount of the fuel supplied to the internal combustion engine. The circuitry calculates a cylinder injection amount of fuel injected from the cylinder fuel injection valve. The circuitry corrects the cylinder injection amount to decrease in accordance with a degree of drop in the actual fuel pressure comparing to a target fuel pressure of the fuel supplied to the cylinder fuel injection valve such that fuel injection from the cylinder fuel injection valve ends by a target injection end timing. The circuitry calculates a port injection amount of the fuel injected from a port fuel injection valve based on the demanded fuel amount and the corrected cylinder injection amount.

11 Claims, 10 Drawing Sheets

(56) References Cited

U.S. PATENT DOCUMENTS

| | | | |
|---|---|---|---|
| 2010/0163004 A1* | 7/2010 | Kurata | F02D 41/406 123/491 |
| 2010/0250097 A1* | 9/2010 | Yamada | F02D 41/401 701/103 |
| 2011/0048393 A1* | 3/2011 | Akita | F02D 41/0032 123/704 |
| 2014/0251280 A1* | 9/2014 | Ikoma | F02D 41/042 123/478 |

* cited by examiner

FUEL INJECTION CONTROL DEVICE

CROSS-REFERENCE TO RELATED APPLICATIONS

The present application claims priority under 35 U.S.C. § 119 to Japanese Patent Application No. 2016-022535, filed Feb. 9, 2016, entitled "Internal Combustion Engine Fuel Injection Control Device." The contents of this application are incorporated herein by reference in their entirety.

BACKGROUND

1. Field

The present disclosure relates to a fuel injection control device.

2. Description of the Related Art

Known internal combustion engine fuel injection control devices of this type include that described in Japanese Unexamined Patent Application Publication No. 2003-13784. In this control device, an amount of fuel to be injected through a cylinder fuel injection valve (cylinder injection amount) and an amount of fuel to be injected through a port fuel injection valve (port injection amount) are determined as follows. First, a demanded fuel amount demanded by the internal combustion engine is computed based on a target air-to-fuel ratio and an air intake amount. Next, a ratio of the cylinder injection amount against the demanded fuel amount is set according to the revolution speed of the engine. The cylinder injection amount is then computed from the ratio set by the demanded fuel amount, and the difference between the demanded fuel amount and the cylinder injection amount is computed as the port injection amount.

SUMMARY

According to a first aspect of the present invention, a fuel injection control device for an internal combustion engine in which fuel is supplied through a cylinder fuel injection valve that injects fuel inside a cylinder, and through a port fuel injection valve that injects fuel into an air intake port, the fuel injection control device includes a demanded fuel amount computation unit, a cylinder injection amount computation unit, an actual fuel pressure detection unit, a cylinder injection amount correction unit, and a port injection amount computation unit. The demanded fuel amount computation unit computes a demanded fuel amount demanded by the internal combustion engine. The cylinder injection amount computation unit computes a cylinder injection amount. This is an amount of fuel to be injected through the cylinder fuel injection valve. The actual fuel pressure detection unit detects an actual value of pressure of fuel supplied to the cylinder fuel injection valve as an actual fuel pressure. The cylinder injection amount correction unit, based on a degree of drop in the actual fuel pressure with respect to a target fuel pressure, corrects the cylinder injection amount toward a decrease side such that fuel injection through the cylinder fuel injection valve ends by a specific target injection end timing. The target fuel pressure is a target value for the fuel pressure. The port injection amount computation unit computes a port injection amount based on the computed demanded fuel amount and the corrected cylinder injection amount. The port injection amount is an amount of fuel to be injected through the port fuel injection valve.

According to a second aspect of the present invention, a fuel injection control device for an internal combustion engine, includes a fuel pressure sensor and circuitry. The internal combustion engine includes a cylinder fuel injection valve to inject fuel inside a cylinder and a port fuel injection valve to inject fuel into an air intake port. The fuel pressure sensor detects an actual fuel pressure of the fuel supplied to the cylinder fuel injection valve. The circuitry is configured to calculate a demanded amount of the fuel supplied to the internal combustion engine. The circuitry is configured to calculate a cylinder injection amount of fuel injected from the cylinder fuel injection valve. The circuitry is configured to correct the cylinder injection amount to decrease in accordance with a degree of drop in the actual fuel pressure comparing to a target fuel pressure of the fuel supplied to the cylinder fuel injection valve such that fuel injection from the cylinder fuel injection valve ends by a target injection end timing. The circuitry is configured to calculate a port injection amount of the fuel injected from the port fuel injection valve based on the demanded fuel amount and the corrected cylinder injection amount.

According to a third aspect of the present invention, a fuel injection control device for an internal combustion engine, includes a fuel pressure sensor, a first calculator, a second calculator, a third calculator, and a fourth calculator. The internal combustion engine includes a cylinder fuel injection valve to inject fuel inside a cylinder and a port fuel injection valve to inject fuel into an air intake port. The fuel pressure sensor detects an actual fuel pressure of the fuel supplied to the cylinder fuel injection valve. The first calculator calculates a demanded amount of the fuel supplied to the internal combustion engine. The second calculator calculates a cylinder injection amount of fuel injected from the cylinder fuel injection valve. The third calculator corrects the cylinder injection amount to decrease in accordance with a degree of drop in the actual fuel pressure comparing to a target fuel pressure of the fuel supplied to the cylinder fuel injection valve such that fuel injection from the cylinder fuel injection valve ends by a target injection end timing. The fourth calculator calculates a port injection amount of the fuel injected from the port fuel injection valve based on the demanded fuel amount and the corrected cylinder injection amount.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
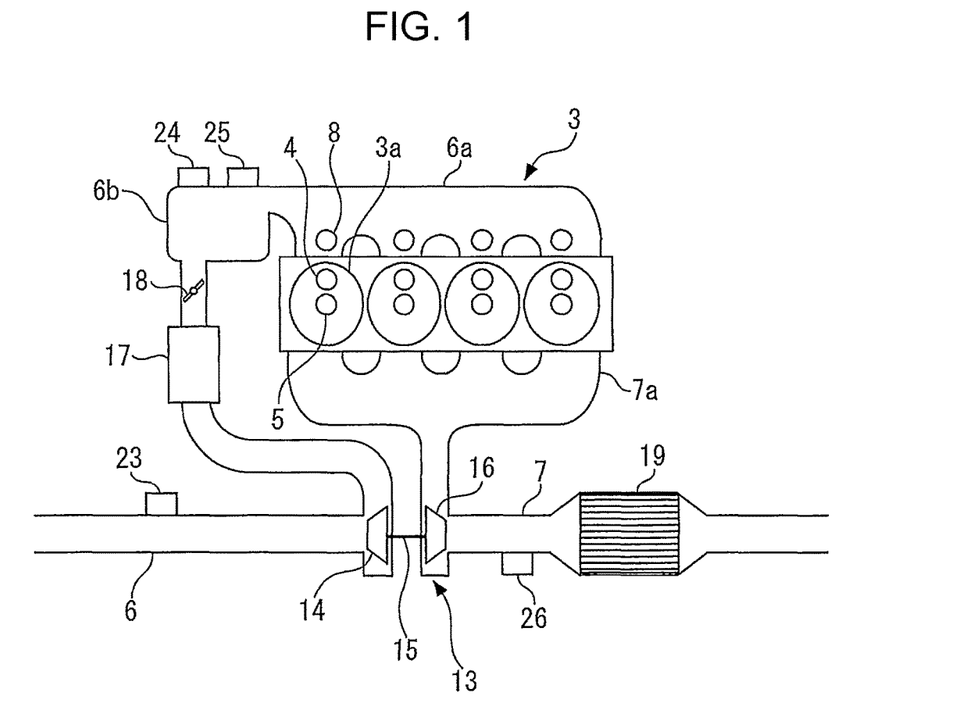
FIG. 1 is a schematic diagram illustrating an internal combustion engine applied with a fuel injection control device according to an embodiment of the present disclosure.

Explanation follows regarding a preferable embodiment of the present disclosure, with reference to the drawings. As illustrated in FIG. 1, an internal combustion engine (referred to below as the "engine") 3 applied with the present disclosure is an inline-four cylinder gasoline engine with four cylinders 3a, and is installed in a vehicle (not illustrated in the drawings) as a source of motive power.

Figure 2:
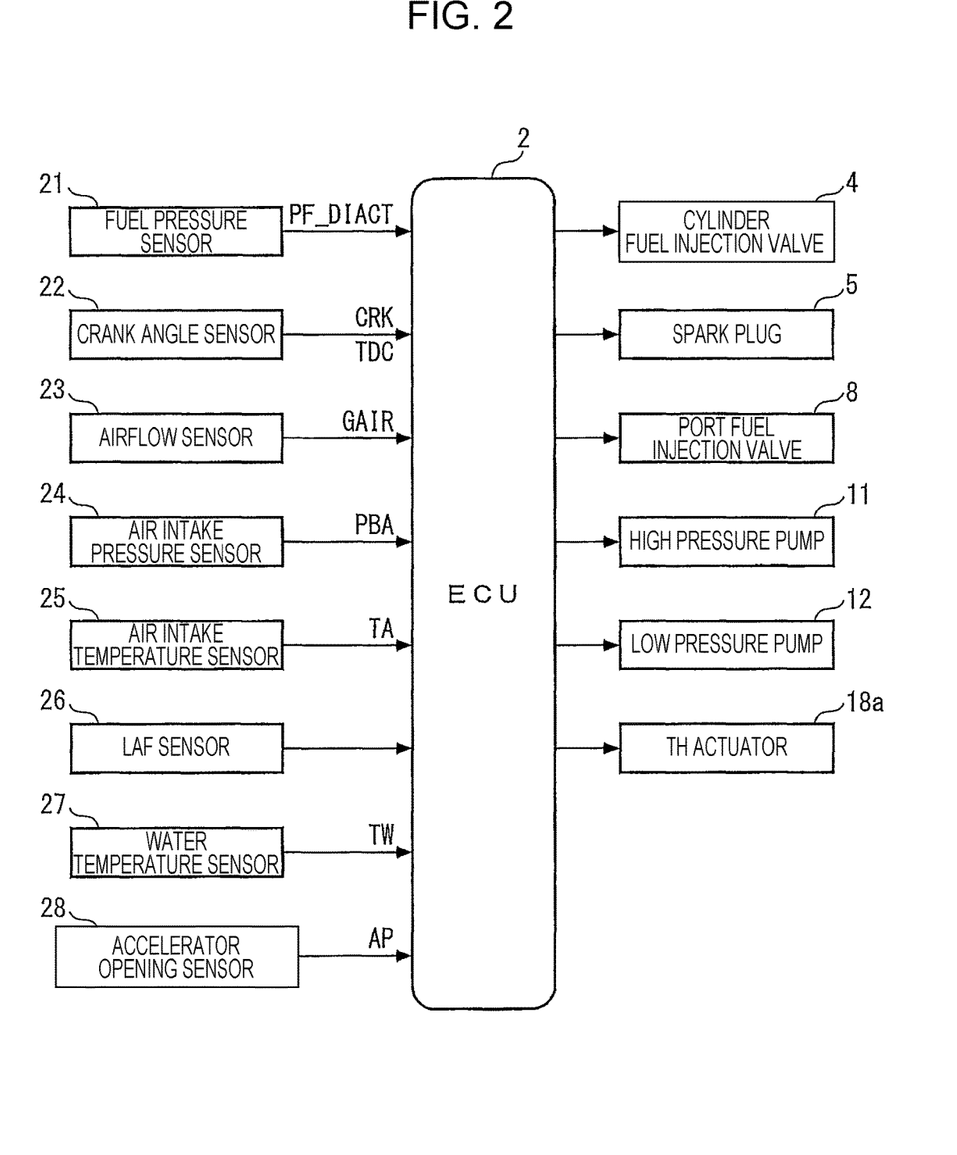
FIG. 2 is a block diagram of a fuel injection control device.

Each cylinder 3a of the engine 3 is provided with a cylinder fuel injection valve 4 and a spark plug 5 facing a combustion chamber (not illustrated in the drawings). The cylinder fuel injection valve 4 is a direct injection type that injects fuel directly into the combustion chamber. The cylinder fuel injection valve 4 and the spark plug 5 are connected to an Electronic Control Unit (referred to below as the "ECU") 2 (see FIG. 2). A valve-open duration and valve opening/closing timings of the cylinder fuel injection valve 4, and a spark duration of the spark plug 5, are controlled by the ECU 2.

The cylinder fuel injection valve 4 is connected to a high pressure pump 11 (see FIG. 2) through a high pressure fuel supply pipe (not illustrated in the drawings). Fuel is fed out from a fuel tank (not illustrated in the drawings) by the high pressure pump 11, and after the pressure of the fuel has been raised to a high pressure by the high pressure pump 11, the fuel is supplied to the cylinder fuel injection valves 4. Operation of the high pressure pump 11 is controlled by the ECU 2, thereby controlling the pressure (referred to below as "fuel pressure") PF_DI of the fuel supplied to the cylinder fuel injection valve 4. An actual value of the fuel pressure PF_DI (referred to below as "actual fuel pressure") PF_DI-ACT is detected by a fuel pressure sensor 21 (see FIG. 2) provided in the vicinity of the cylinder fuel injection valve 4 of the fuel supply pipe, and a detection signal is output to the ECU 2.

An air intake path 6 is connected to each cylinder 3a through an air intake manifold 6a, and an exhaust path 7 is connected to each cylinder 3a through an exhaust manifold 7a. The air intake manifold 6a is provided with a port fuel injection valve 8 for each cylinder 3a. Valve-open durations and valve opening/closing timings of the port fuel injection valves 8 are controlled by the ECU 2.

The port fuel injection valve 8 is connected to a low pressure pump 12 (see FIG. 2) through a low pressure fuel supply pipe (not illustrated in the drawings). Fuel is fed out from the fuel tank by the low pressure pump 12, and after the pressure of the fuel has been raised to a lower pressure than that of the high pressure pump 11 by the low pressure pump 12, the fuel is supplied to the port fuel injection valves 8, and injected from the port fuel injection valve 8 toward an air intake port (not illustrated in the drawings). Operation of the low pressure pump 12 is controlled by the ECU 2, thereby controlling the pressure of the fuel supplied to the port fuel injection valve 8.

The engine 3 includes a turbo charger 13. The turbo charger 13 includes a compressor 14 provided on the air intake path 6, and a turbine 16 provided on the exhaust path 7 and integrally coupled to the compressor 14 through a shaft 15. The turbine 16 is driven by exhaust gas flowing in the exhaust path 7, and the air intake is supercharged due to the turbine 16 and the compressor 14 rotating together as a unit.

An inter cooler 17, for cooling the air intake of increased temperature due to being supercharged, and a throttle valve 18 are provided on the air intake path 6, in sequence on the downstream side of the compressor 14 of the turbo charger 13. The degree of opening of the throttle valve 18 is controlled via a TH actuator 18a (see FIG. 2) in response to a control signal from the ECU 2, thereby controlling an air intake amount introduced to the cylinders 3a. Moreover, a three-way catalyst 19 for cleaning the exhaust gas is provided further toward the exhaust path 7 downstream side than the turbine 16.

The engine 3 is also provided with various sensors, described below, in addition to the fuel pressure sensor 21 described above, in order to detect drive states of the engine 3. Detection signals from the sensors are input to the ECU 2 (see FIG. 2).

A crank angle sensor 22 outputs a CRK signal, this being a pulse signal each time a crank goes through a specific angle as a crank shaft rotates, and a TDC signal. The CRK signal is output every specific crank angle (for example 0.5°). The ECU 2 computes the revolution speed (referred to below as the "engine revolution speed") NE of the engine 3 based on the CRK signal.

The TDC signal is a signal expressing that a piston (not illustrated in the drawings) of the engine 3 is at a specific crank angle position in the vicinity of the top dead center (air intake TDC) at the start of an air intake process in any one of the cylinders 3a. When the engine 3 has four cylinders such as in the present embodiment, a TDC signal is output each time the crank angle goes through 180°. The ECU 2 computes a crank angle CA for each of the cylinders 3a according to the TDC signals and the CRK signals. The crank angle CA takes the air intake TDC at the output timing of the TDC signal as a reference (value of 0), and is expressed as positive on the advanced angle side (BTDC).

The air intake path 6 is provided with an airflow sensor 23 at an upstream side of the compressor 14, and is provided with an air intake pressure sensor 24 and an air intake temperature sensor 25 in an air intake chamber 6b on the downstream side of the throttle valve 18. The airflow sensor 23 detects an amount of air (new air) (air intake amount) GAIR introduced to the cylinders 3a. The air intake pressure sensor 24 detects an air intake pressure PBA as an absolute pressure. The air intake temperature sensor 25 detects the temperature (air intake temperature) TA of the air intake introduced to the cylinders 3a.

An LAF sensor 26 is provided on the exhaust path 7, between the turbine 16 and the three-way catalyst 19. The LAF sensor 26 continuously detects the oxygen concentration in the exhaust gas flowing into the three-way catalyst 19 over a wide air-to-fuel ratio range encompassing the theoretical air-to-fuel ratio. The ECU 2 computes an air-to-fuel ratio (referred to below as the "actual air-to-fuel ratio") KACT based on these detection signals. The actual air-to-fuel ratio KACT is expressed as an equivalent ratio.

A water temperature sensor 27 outputs detection signals expressing a temperature (referred to below as the "engine water temperature") TN of cooling water that cools the engine 3. An accelerator opening sensor 28 outputs detection signals expressing a pressing amount (referred to below as the "accelerator opening") AP of an accelerator pedal (not illustrated in the drawings) of the vehicle.

The ECU 2 is configured by a microcomputer including a CPU, RAM, ROM, and an I/O interface (none of which are illustrated in the drawings). The ECU 2 executes various engine control processing in response to the detection signals of the sensors 21 to 28 described above, including processing such as control of the cylinder fuel injection valves 4 and the port fuel injection valves 8, and control of the spark plugs 5.

In the present embodiment, the ECU 2 corresponds to a demanded fuel amount computation unit, a cylinder injection amount computation unit, a cylinder injection amount correction unit, a port injection amount computation unit, an upper limit cylinder injection amount correction unit, a provisional injection end timing computation unit, an upper limit cylinder injection amount correction unit, a flow rate ratio parameter computation unit, and a target injection end timing setting unit.

Figure 3:
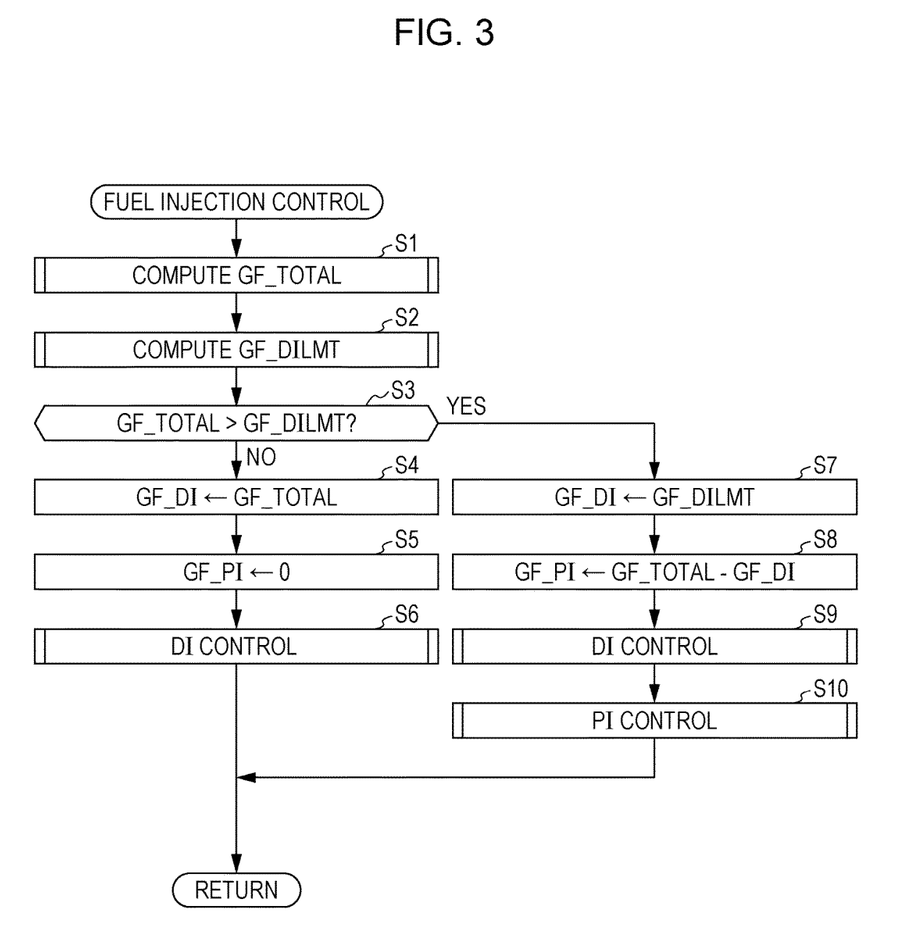
FIG. 3 is a flowchart illustrating fuel injection control processing.

Next, explanation follows regarding fuel injection control processing executed by the ECU 2, with reference to FIG. 3. The present processing is processing to control the injection amounts and injection timings of the cylinder fuel injection valve 4 and the port fuel injection valve 8 respectively, and is executed in synchronization with TDC signal generation.

In the present processing, first, at step 1, a demanded fuel amount GF_TOTAL is computed. The demanded fuel amount GF_TOTAL is the overall amount of fuel demanded by the engine 3, and is computed by the computation processing illustrated in FIG. 4.

Figure 4:
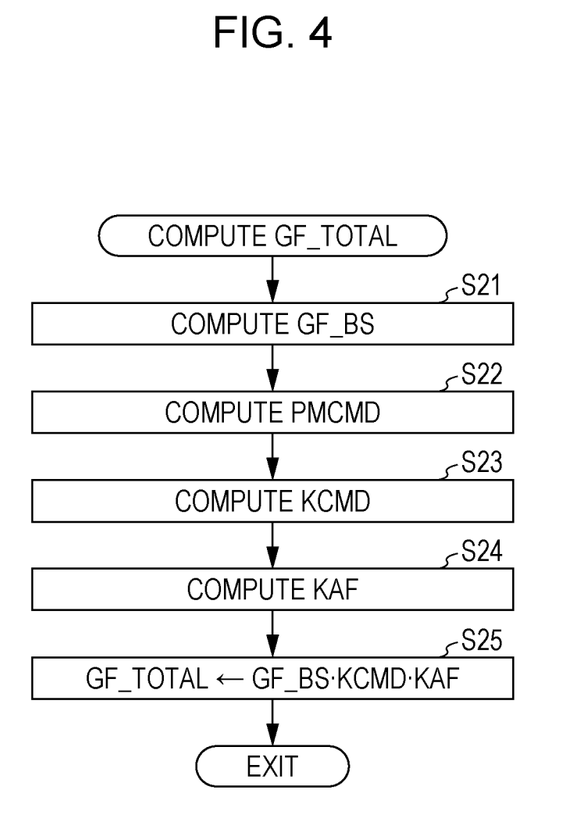
FIG. 4 is a flowchart illustrating computation processing for a demanded fuel amount.

In this computation processing, first, at step 21, a basic fuel amount GF_BS is computed according to the detected air intake amount GAIR. The basic fuel amount GF_BS is computed as the amount of fuel for the air intake amount GAIR according to the theoretical air-to-fuel ratio.

Next, a demanded torque PMCMD is computed (step 22). This computation is performed by searching a specific map (not illustrated in the drawings) based on the detected engine revolution speed NE and accelerator opening AP. Next, a target air-to-fuel ratio KCMD is computed by searching a specific map (not illustrated in the drawings) based on the engine revolution speed NE and demanded torque PMCMD (step 23). The target air-to-fuel ratio KCMD is expressed as an equivalent ratio.

Next, an air-to-fuel ratio correction coefficient KAF, such that the actual air-to-fuel ratio KACT detected by the LAF sensor 26 converges with the target air-to-fuel ratio KCMD, is computed by employing a specific feedback control algorithm (step 24). Finally, the basic fuel amount GF_BS is multiplied by the target air-to-fuel ratio KCMD and the air-to-fuel ratio correction coefficient KAF to compute the demanded fuel amount GF_TOTAL (step 25), and the present processing is ended.

Returning to the processing of FIG. 3, at step 2 following on from step 1, an upper limit cylinder injection amount GF_DILMT is computed. The upper limit cylinder injection amount GF_DILMT is employed to limit a cylinder injection amount GF_DI, and is computed by the computation processing illustrated in FIG. 5.

Figure 5:
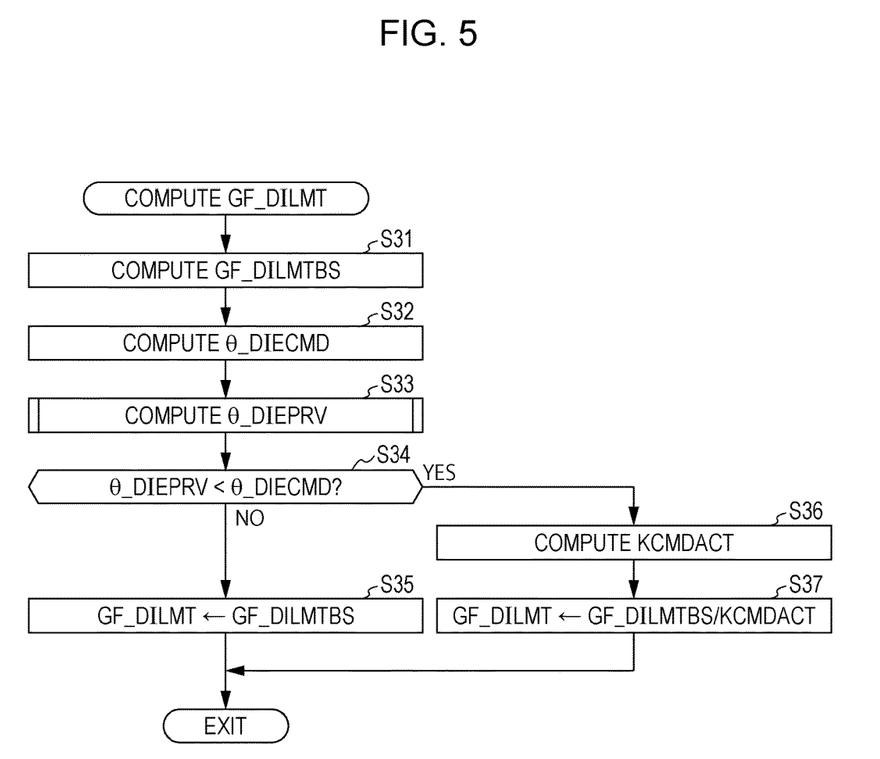
FIG. 5 is a flowchart illustrating computation processing for an upper limit cylinder injection amount.

In this computation processing, first, a basic upper limit cylinder injection amount GF_DILMTBS is computed at step 31. The basic upper limit cylinder injection amount GF_DILMTBS is based on the specification of the cylinder fuel injection valves 4 employed, and corresponds to the maximum fuel amount that can be injected by the cylinder fuel injection valves 4 at a specific reference crank angle period $\Delta\theta$REF under the condition that a fuel pressure PF_DI is at a specific reference fuel pressure PF_DIREF. The basic upper limit cylinder injection amount GF_DILMTBS is computed by searching a specific map (not illustrated in the drawings) based on the engine revolution speed NE.

Next, a target injection end timing $\theta$_DIECMD is computed by searching a specific map (not illustrated in the drawings) based on the engine revolution speed NE (step 32). The target injection end timing $\theta$_DIECMD is set to immediately before a timing at which it is predicted that the combustion state in the combustion chamber will become unstable, close to the final stage of the air intake process, and is expressed by the crank angle CA. In this map, the target injection end timing $\theta$_DIECMD is set to a larger crank angle CA, namely, further toward the advanced angle side, the higher the engine revolution speed NE. This is because the higher the engine revolution speed NE, the shorter the length of time corresponding to a given crank angle period, and the combustion state would become unstable unless fuel injection is completed earlier.

Next, a provisional injection end timing $\theta$_DIEPRV is computed (step 33). The provisional injection end timing $\theta$_DIEPRV corresponds to an injection end timing under the assumed condition that the fuel pressure PF_DI is the actual fuel pressure PF_DIACT, and that fuel of the basic upper limit cylinder injection amount GF_DILMTBS described above has been injected, and is computed by the computation processing illustrated in FIG. 6.

Figure 6:
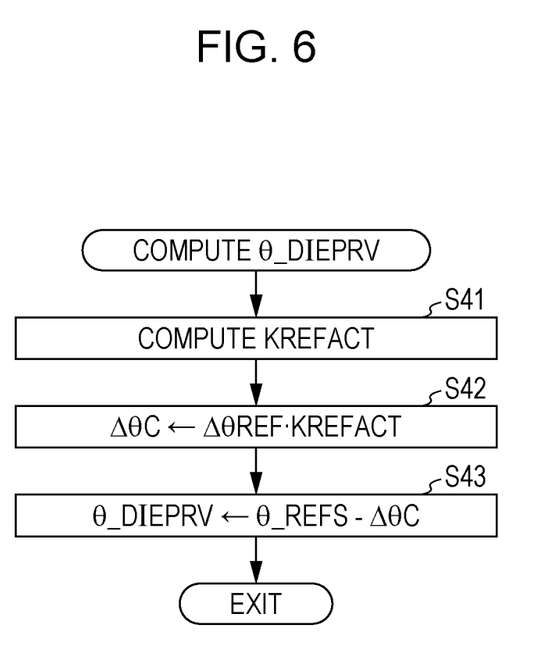
FIG. 6 is a flowchart illustrating computation processing for a provisional injection end timing.

In this computation processing, first, the reference fuel pressure PF_DIREF, the actual fuel pressure PF_DIACT, and an air intake pressure PBA are employed to compute a reference-to-actual fuel pressure correction coefficient KREFACT using Equation (1).

$$KREFACT = \frac{\sqrt{PF\_DIREF - PBA}}{\sqrt{PF\_DIACT - PBA}} \qquad (1)$$

The reference-to-actual fuel pressure correction coefficient KREFACT is employed to correct an injection duration when the fuel pressure PF_DI is the reference fuel pressure PF_DIREF, to an injection duration when the fuel pressure PF_DI is the actual fuel pressure PF_DIACT for a given fuel injection amount. Equation (1) is derived from the following Equations (2) to (4).

$$QREF = Cd \cdot A \cdot \sqrt{2/\rho} \cdot \sqrt{PF\_DIREF - PBA} \qquad (2)$$

$$QACT = Cd \cdot A \cdot \sqrt{2/\rho} \cdot \sqrt{PF\_DIACT - PBA} \qquad (3)$$

$$KREFACT = \frac{QREF}{QACT} \qquad (4)$$

Note that QREF in Equation (2) is a fuel flow rate at reference fuel pressure injected from the cylinder fuel injection valve 4 when the fuel pressure PF_DI is the reference fuel pressure PF_DIREF. QACT in Equation (3) is a fuel flow rate at actual fuel pressure, and is the fuel flow rate injected from the cylinder fuel injection valve 4 when the fuel pressure PF_DI is the actual fuel pressure PF_DIACT. Both Equations (2) and (3) assume the cylinder fuel injection valve 4 is a Venturi tube, with a back pressure (upstream pressure) taken as the fuel pressure PF_DI (reference fuel pressure PF_DIREF, actual fuel pressure PF_DIACT), and a front pressure (downstream pressure) taken as the air intake pressure PBA. Equations (2) and (3) apply Bernoulli's principle. On the right side of the equation, Cd is a flow rate coefficient, A is the opening area of the cylinder fuel injection valve 4, and $\rho$ is the fuel density.

As illustrated in Equation (4), the reference-to-actual fuel pressure correction coefficient KREFACT is defined as a ratio (QREF/QACT) of the reference fuel pressure fuel flow rate QREF against the actual fuel pressure fuel flow rate QACT. Equation (1) is derived from Equation (4), and from Equations (2) and (3).

Next, at step 42, the reference crank angle period ΔθREF employed when computing the basic upper limit cylinder injection amount GF_DILMTBS is multiplied by the reference-to-actual fuel pressure correction coefficient KREFACT to compute a corrected crank angle period ΔθC. Finally, the corrected crank angle period ΔθC is subtracted from a start stage θ_REFS of the reference crank angle period ΔθREF to compute the provisional injection end timing θ_DIEPRV (step 43), and the present processing is ended.

Returning to the processing of FIG. 5, at step 34 following on from step 33, determination is made as to whether or not the provisional injection end timing θ_DIEPRV is smaller than the target injection end timing θ_DIECMD computed at step 32, namely, determination is made as to whether or not the provisional injection end timing θ_DIEPRV is on the lag angle side. When the answer is NO, and the provisional injection end timing θ_DIEPRV matches the target injection end timing θ_DIECMD, or is on the advanced angle side of the target injection end timing θ_DIECMD, the basic upper limit cylinder injection amount GF_DILMTBS computed at step 31 is computed as the final upper limit cylinder injection amount GF_DILMT (step 35), and the present processing is ended.

However, when the answer at step 34 is YES, and the provisional injection end timing θ_DIEPRV is on the lag angle side of the target injection end timing θ_DIECMD, use of the basic upper limit cylinder injection amount GF_DILMTBS as it is as the upper limit cylinder injection amount GF_DILMT might result in the combustion state becoming unstable. At the next steps 36 and 37, the upper limit cylinder injection amount GF_DILMT is accordingly corrected toward a decrease side and limited.

First, at step 36, a target-to-actual fuel pressure correction coefficient KCMDACT is computed using the following Equation (5).

$$KCMDACT = \frac{\sqrt{PF\_DICMD - PBA}}{\sqrt{PF\_DIACT - PBA}} \quad (5)$$

The target-to-actual fuel pressure correction coefficient KCMDACT is for correcting the injection duration when the fuel pressure PF_DI is the target fuel pressure PF_DICMD, to the injection duration when at the actual fuel pressure PF_DIACT. The target fuel pressure PF_DICMD is PF_DICMD by searching a specific map (not illustrated in the drawings) based on the engine revolution speed NE and the air intake amount GAIR to compute a basic value, and then correcting the basic value with an engine water temperature TW representing the engine 3 in a warmed-up state.

Equation (5) is derived from the following Equations (6) and (7).

$$QCMD = Cd \cdot A \cdot \sqrt{2/\rho} \cdot \sqrt{PF\_DICMD - PBA} \quad (6)$$

$$KCMDACT = \frac{QCMD}{QACT} \quad (7)$$

In Equation (6) QCMD is a fuel flow rate at target fuel pressure, and is the fuel flow rate injected from the cylinder fuel injection valve 4 when the fuel pressure PF_DI is a target fuel pressure PF_DICMD. Equation (6) is a similar equation to Equations (2) and (3). As illustrated in Equation (7), the target-to-actual fuel pressure correction coefficient KCMDACT is defined as a flow rate ratio of the target fuel pressure fuel flow rate QCMD against the actual fuel pressure fuel flow rate QACT of Equation (3) (QCMD/QACT). Equation (5) is derived from Equation (7), and from Equations (3) and (6).

Next, the basic upper limit cylinder injection amount GF_DILMTBS is multiplied by the reciprocal of the computed target-to-actual fuel pressure correction coefficient KCMDACT to compute the final upper limit cylinder injection amount GF_DILMT (step 37), and the present processing is ended. As described above, the target-to-actual fuel pressure correction coefficient KCMDACT corresponds to a flow rate ratio of the target fuel pressure fuel flow rate QCMD against the actual fuel pressure fuel flow rate QACT, and so by multiplying the basic upper limit cylinder injection amount GF_DILMTBS by the reciprocal of the target-to-actual fuel pressure correction coefficient KCMDACT (1/KCMDACT), the upper limit cylinder injection amount GF_DILMT is corrected toward the decrease side according to the degree of drop in the fuel flow rate accompanying a drop in the actual fuel pressure PF_DIACT.

Returning to the processing of FIG. 3, at step 3 following on from step 2, determination is made as to whether or not the demanded fuel amount GF_TOTAL computed at step 1 is greater than the upper limit cylinder injection amount GF_DILMT computed at step 35 or step 37. When the answer is NO, the demanded fuel amount GF_TOTAL is the upper limit cylinder injection amount GF_DILMT or lower, and the cylinder injection amount GF_DI is set to the demanded fuel amount GF_TOTAL (step 4), and a port injection amount GF_PI is set to 0 (step 5). Namely, in such cases, fuel is supplied solely from the cylinder fuel injection valves 4, and fuel supply from the port fuel injection valve 8 is stopped.

Next, processing proceeds to step 6, and DI control is executed. The DI control determines a cylinder injection duration TOUT_DI, a cylinder injection start timing θ_DIS, and a cylinder injection end timing θ_DIE, these being control parameters of the cylinder fuel injection valve 4, and is executed by the control processing illustrated in FIG. 7.

Figure 7:
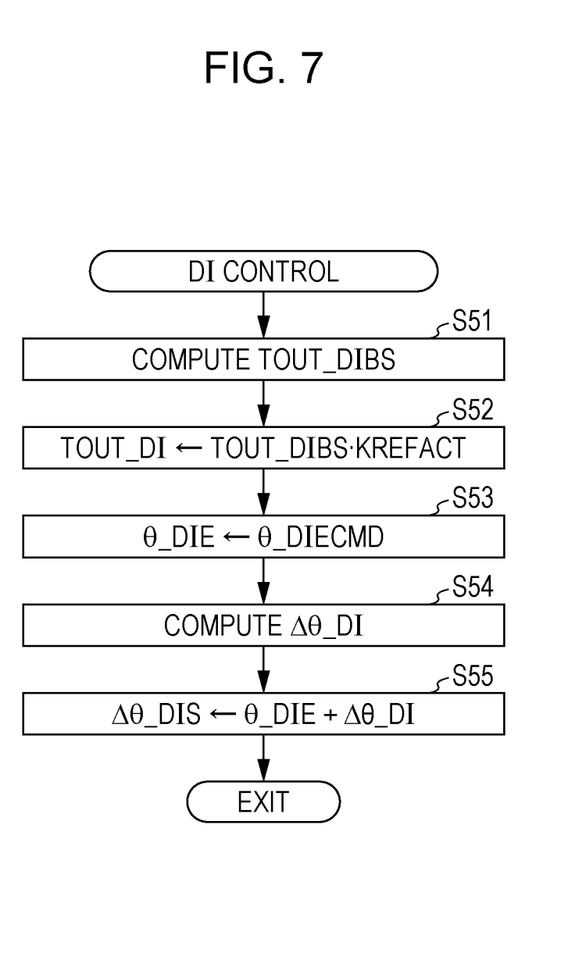
FIG. 7 is a flowchart illustrating DI control processing.

In the present processing, first, at step 51, a basic cylinder injection duration TOUT DIBS is computed by searching a specific map (not illustrated in the drawings) based on the cylinder injection amount GF_DI computed at step 4. This map is a mapping, found by experimentation or the like, of the relationship between the valve-open duration of the cylinder fuel injection valve 4 and the fuel injection amount under the conditions that the fuel pressure PF_DI is the reference fuel pressure PF_DIREF and the pressure inside the cylinder 3a is a specific reference pressure (for example a value corresponding to atmospheric pressure).

Next, the computed basic cylinder injection duration TOUT DIBS is multiplied by the reference-to-actual fuel pressure correction coefficient KREFACT computed at step 41 in FIG. 6, so as to compute the cylinder injection duration TOUT_DI (step 52).

Next, a cylinder injection end timing θ_DIE is set to the target injection end timing θ_DIECMD computed at step 32 in FIG. 5 (step 53). Next, the cylinder injection duration TOUT_DI is converted into a crank angle period Δθ_DI according to the engine revolution speed NE (step 54). Finally, the crank angle period Δθ_DI is added to the cylinder injection end timing θ_DIE so as to compute the cylinder injection start timing θ_DIS (step 55), and the present processing is ended.

Returning to the processing of FIG. 3, when the answer at step 3 is YES, and the demanded fuel amount GF_TOTAL is greater than the upper limit cylinder injection amount GF_DILMT, the cylinder injection amount GF_DI is set as the upper limit cylinder injection amount GF_DILMT (step 7), and the difference between the demanded fuel amount GF_TOTAL and the cylinder injection amount GF_DI (GF_TOTAL−GF_DI) is computed as the port injection amount GF_PI (step 8). Namely, in such cases, fuel is supplied from both the cylinder fuel injection valves 4 and the port fuel injection valves 8. Next, at step 9, similarly to at step 6, DI control is executed by the processing in FIG. 7 to determine the cylinder injection duration TOUT_DI, the cylinder injection start timing θ_DIS, and the cylinder injection end timing θ_DIE.

Figure 8:
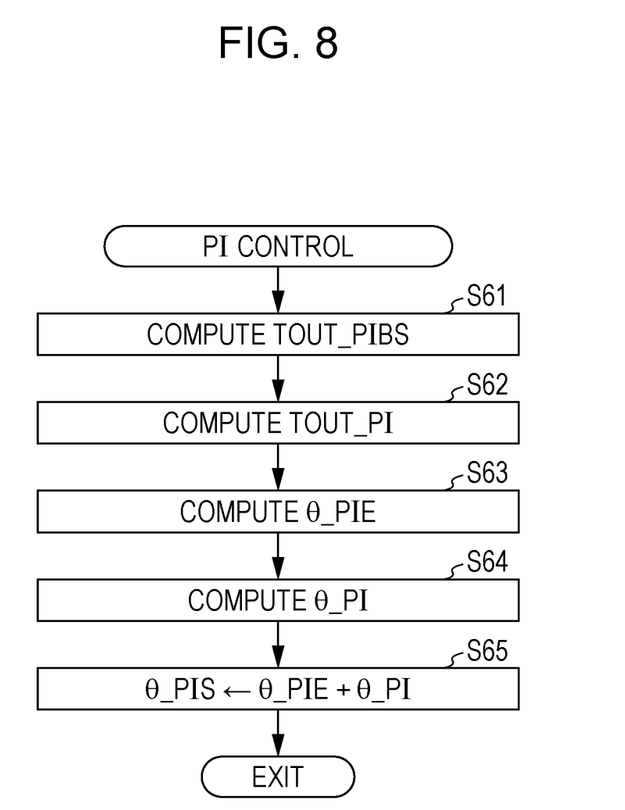
FIG. 8 is a flowchart illustrating PI control processing.

Next, at step 10, PI control is executed by the control processing in FIG. 8, and the present processing is ended. Brief explanation follows regarding the PI control. First, at step 61, a basic port injection duration TOUT_PIBS is computed by searching a specific map (not illustrated in the drawings) based on the port injection amount GF_PI computed at step 8. Next, a port injection duration TOUT_PI is computed by correcting the basic port injection duration TOUT_PIBS according to the air intake pressure PBA corresponding to the front pressure of the port fuel injection valve 8, and the like (step 62).

Next, a port injection end timing θ_PIE is computed by searching a specific map (not illustrated in the drawings) based on the port injection duration TOUT_PI and the engine revolution speed NE (step 63). Then, the port injection duration TOUT_PI is converted into a crank angle period Δθ_PI according to the engine revolution speed NE (step 64). Then, the crank angle period Δθ_PI is added to the port injection end timing θ_PIE to compute a port injection start timing θ_PIS (step 65), and the present processing is ended. The port injection start timing θ_PIS and the port injection end timing θ_PIE are set so as to basically be during the air intake process.

Figure 9:
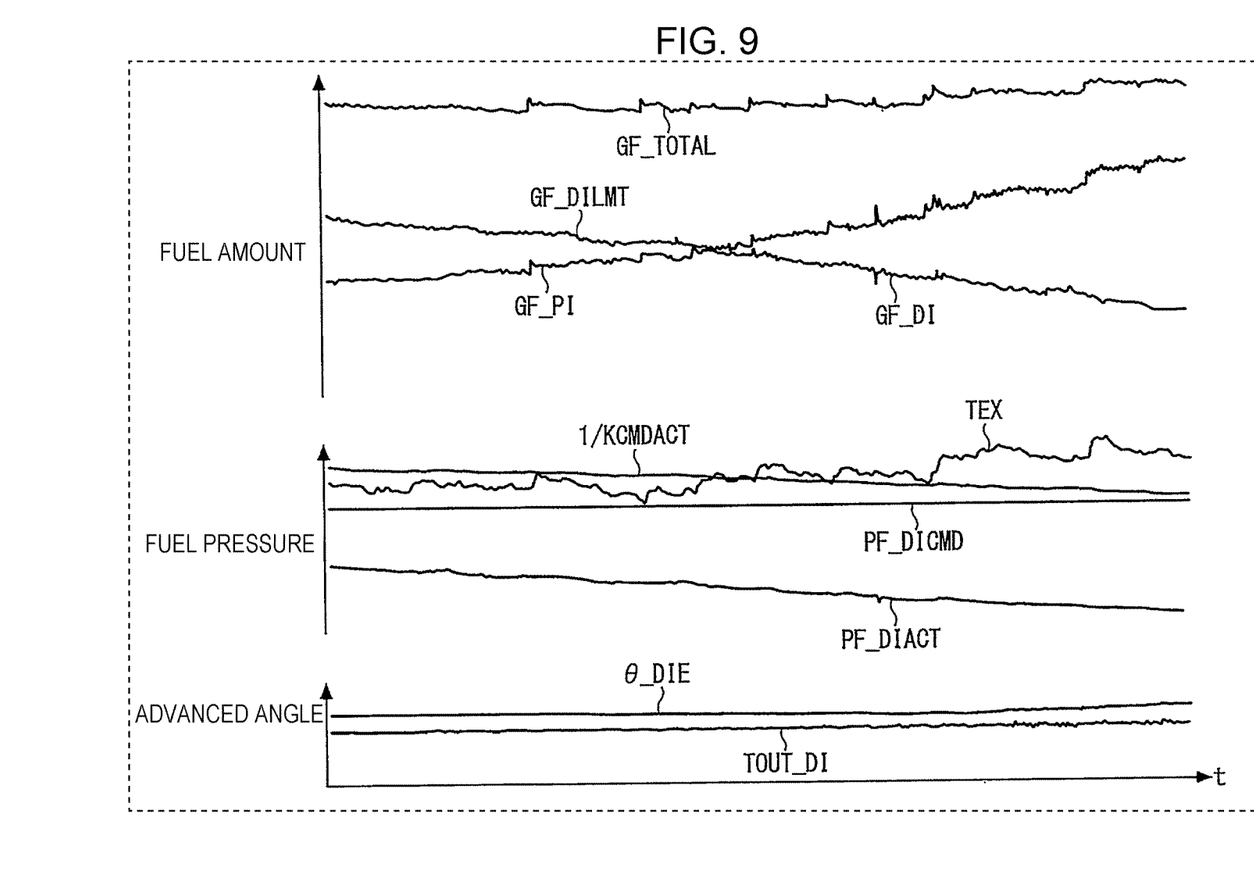
FIG. 9 is a timing chart illustrating an example of operation of a fuel injection control device.

Explanation follows regarding an example of operation of a fuel injection control device of the embodiment described above. FIG. 9 illustrates an example of operation of the embodiment, and FIG. 10 illustrates, as a comparison to the embodiment described above, an example of operation in a case in which there is no correction to decrease the cylinder injection amount GF_DI according to the drop in the fuel pressure PF_DI.

Figure 10:
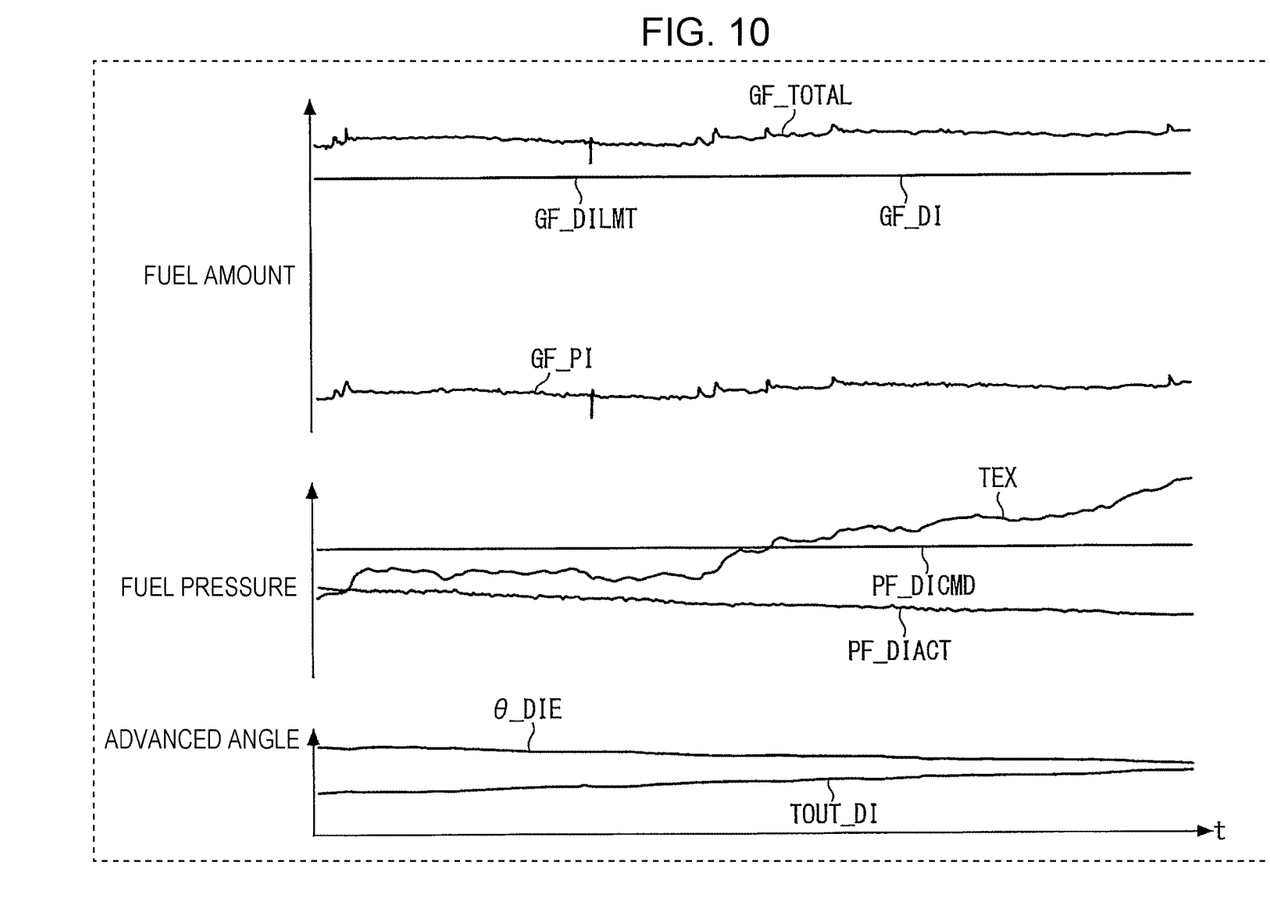
FIG. 10 is a timing chart illustrating a comparative example to the example of operation in FIG. 9.

First, in the comparative example in FIG. 10, since the demanded fuel amount GF_TOTAL is greater than the upper limit cylinder injection amount GF_DILMT, the cylinder injection amount GF_DI is equivalent to the upper limit cylinder injection amount GF_DILMT, and the port injection amount GF_PI is set to the difference between the demanded fuel amount GF_TOTAL and the cylinder injection amount GF_DI. Due to malfunction of the high pressure pump 11 or the like, the actual fuel pressure PF_DIACT does not reach the substantially constant target fuel pressure PF_DICMD, and gradually drops over time, such that the difference to the target fuel pressure PF_DICMD increases.

In the comparative example, the upper limit cylinder injection amount GF_LMT is maintained, and accordingly the cylinder injection amount GF_DI remains constant, even in such cases in which the actual fuel pressure PF_DIACT has dropped in this manner. Accordingly, the cylinder injection duration TOUT_DI becomes longer as the actual fuel pressure PF_DIACT drops, the cylinder injection end timing θ_DIE accordingly gradually becomes later, and ultimately falls into the later stage of the compression process. There is also a comparatively large increase in an exhaust gas temperature TEX.

In contrast thereto, in the example of operation of the embodiment illustrated in FIG. 9, if the actual fuel pressure PF_DIACT has dropped as described above, when the provisional injection end timing θ_DIEPRV computed based on the actual fuel pressure PF_DIACT falls on the lag angle side of the target injection end timing θ_DIECMD (step 34: YES), the target-to-actual fuel pressure correction coefficient KCMDACT is computed (step 36), and the basic upper limit cylinder injection amount GF_DILMTBS is multiplied by the reciprocal thereof (1/KCMDACT) so as to correct the upper limit cylinder injection amount GF_DILMT toward the decrease side (step 37), and the cylinder injection amount GF_DI is limited to the corrected upper limit cylinder injection amount GF_DILMT (step 7 in FIG. 3).

As a result of the above correction, the upper limit cylinder injection amount GF_DILMT and the cylinder injection amount GF_DI gradually decreases according to the actual fuel pressure PF_DIACT that is dropping over time, with a corresponding gradual increase in the port injection amount GF_PI. Moreover, the cylinder injection end timing θ_DIE is set to the target injection end timing θ_DIECMD (step 53), and is maintained substantially constant. An increase in the exhaust gas temperature is accordingly suppressed in comparison to the comparative example in FIG. 10.

As described above, in the present embodiment, a correction is made to decrease the cylinder injection amount GF_DI based on the degree of drop in the actual fuel pressure PF_DIACT with respect to the target fuel pressure PF_DICMD. Accordingly, fuel injection by the cylinder fuel injection valve 4 can be completed by the target injection end timing θ_DIECMD, without extending the injection period, even when the actual fuel pressure PF_DIACT has dropped due to malfunction of the high pressure pump 11 or the like. This thereby enables a stable combustion state to be secured. Moreover, an increase in the temperature of the exhaust gas due to after-burn can be suppressed, enabling faults resulting therefrom, such as adverse effects on the turbine 16 of the turbo charger 13 disposed on the exhaust path 7, to be avoided.

When the provisional injection end timing θ_DIEPRV computed in the manner described above falls on the lag angle side of the target injection end timing θ_DIECMD, the basic upper limit cylinder injection amount GF_DILMTBS is multiplied by the reciprocal of the target-to-actual fuel pressure correction coefficient KCMDACT so as to correct the upper limit cylinder injection amount GF_DILMT toward the decrease side. Accordingly, the upper limit cylinder injection amount GF_DILMT is corrected as appropriate such that the cylinder injection end timing θ_DIE does not become later than the target injection end timing θ_DIECMD. The cylinder injection amount GF_DI is also limited by the corrected upper limit cylinder injection amount GF_DILMT. Accordingly, the cylinder injection amount GF_DI can be secured at the maximum limit of a range in which the cylinder injection end timing θ_DIE does not become later than the target injection end timing θ_DIECMD, and correction to decrease the cylinder injection amount GF_DI can be performed appropriately.

Moreover, the target-to-actual fuel pressure correction coefficient KCMDACT employed when correcting the upper limit cylinder injection amount GF_DILMT is a ratio of the target fuel pressure fuel flow rate QCMD against the actual fuel pressure fuel flow rate QACT, and corresponds to the reciprocal of the ratio of the durations required to inject a given amount of fuel at the target fuel pressure and at the actual fuel pressure. Accordingly, multiplying the basic upper limit cylinder injection amount GF_DILMTBS of the upper limit cylinder injection amount GF_DILMT by the reciprocal of the target-to-actual fuel pressure correction coefficient KCMDACT enables appropriate correction of the cylinder injection amount GF_DI to be performed according to the degree of drop in the fuel flow rate accompanying the drop in the actual fuel pressure PF_DIACT, and hence appropriated correction to decrease the cylinder injection amount GF_DI.

The target injection end timing A DIECMD is moreover set to immediately before the timing at which the combustion state in the cylinder 3a is predicted to become unstable, thereby enabling a stable combustion state to be secured. Moreover, the higher the engine revolution speed NE, the further toward the advanced angle side the target injection end timing θ_DIECMD is set, thereby enabling an unstable combustion accompanying an increase in the engine revolution speed NE to be reliably avoided.

Note that the present disclosure is not limited to the embodiment described, and may be implemented by various configurations. For example, although in the embodiment, the correction to decrease the cylinder injection amount GF_DI based on the degree of drop in the actual fuel pressure PF_DIACT is performed indirectly using the corrected upper limit cylinder injection amount GF_DILMT, the cylinder injection amount GF_DI may be corrected directly.

The target-to-actual fuel pressure correction coefficient KCMDACT corresponding to the ratio of the target fuel pressure fuel flow rate QCMD against the actual fuel pressure fuel flow rate QACT is computed as a flow rate ratio parameter for correcting the upper limit cylinder injection amount GF_DILMT, and the basic upper limit cylinder injection amount GF_DILMTBS is multiplied by the reciprocal of the target-to-actual fuel pressure correction coefficient KCMDACT to correct the upper limit cylinder injection amount GF_DILMT. However, QACT/QCMD, i.e. the above reciprocal, may be found as a flow rate ratio parameter, and the basic upper limit cylinder injection amount GF_DILMTBS simply multiplied by QACT/QCMD.

In the embodiment, an example is given of setting the injection period of the cylinder fuel injection valve 4 mainly in an air intake process. However, the present disclosure is not limited thereto, and may be applied to cases in which the injection period is mainly during the compression process, such as in an auto-ignition gasoline engine or diesel engine. In the embodiment, an example of a vehicle engine is used; however, there is no limitation thereto, and the present disclosure may, for example, be applied to an internal combustion engine of boat propelling equipment, such as an outboard motor with a vertical crankshaft, or other industrial internal combustion engines. Fine details of the configuration may be modified as appropriate within the scope of the spirit of the present disclosure.

A first aspect of the disclosure describes a fuel injection control device for an internal combustion engine in which fuel is supplied through a cylinder fuel injection valve that injects fuel inside a cylinder, and through a port fuel injection valve that injects fuel into an air intake port. The fuel injection control device includes a demanded fuel amount computation unit (ECU 2 in an embodiment (similar also applies below in this section): step 1 in FIG. 3, FIG. 4) that computes a demanded fuel amount demanded by the internal combustion engine; a cylinder injection amount computation unit (ECU 2, step 7 in FIG. 3) that computes a cylinder injection amount, this being an amount of fuel to be injected through the cylinder fuel injection valve; an actual fuel pressure detection unit (fuel pressure sensor 21) that detects an actual value of pressure of fuel supplied to the cylinder fuel injection valve as an actual fuel pressure; a cylinder injection amount correction unit (ECU 2, steps 34, 36, 37 in FIG. 5) that, based on a degree of drop in the actual fuel pressure with respect to a target fuel pressure, this being a target value for the fuel pressure, corrects the cylinder injection amount toward a decrease side such that fuel injection through the cylinder fuel injection valve ends by a specific target injection end timing; and a port injection amount computation unit (ECU 2, step 8 in FIG. 3) that computes a port injection amount, this being an amount of fuel to be injected through the port fuel injection valve, based on the computed demanded fuel amount and the corrected cylinder injection amount.

According to this fuel injection control device, the demanded fuel amount demanded by the internal combustion engine is computed, and the fuel amount (cylinder injection amount) to be injected through the cylinder fuel injection valve is computed. Moreover, the actual pressure (actual fuel pressure) of the fuel supplied to the cylinder fuel injection valve is detected. In cases in which the detected actual fuel pressure drops with respect to the target fuel pressure, for example due to malfunction of a fuel pump that raises the fuel pressure, the cylinder injection amount is corrected toward the decrease side based on the degree of drop, such that fuel injection through the cylinder fuel injection valve ends by the specific target injection end timing. Moreover, the fuel amount (port injection amount) to be injected through the port fuel injection valve is computed based on the computed demanded fuel amount and the corrected cylinder injection amount.

By correcting to decrease the cylinder injection amount in this manner, the fuel injection by the cylinder fuel injection valve can reliably be made to end by the target injection end timing, with substantially no increase in the injection period, even when the actual fuel pressure has dropped. This thereby enables a stable combustion state to be secured, and enables a temperature increase in the exhaust gas due to after-burn to be suppressed, thus enabling issues caused by this to be avoided.

A second aspect of the disclosure describes the internal combustion engine fuel injection control device of the first aspect, wherein the cylinder injection amount correction unit includes: an upper limit cylinder injection amount computation unit (ECU 2, step 31 in FIG. 5) that computes, as an upper limit cylinder injection amount (basic upper limit cylinder injection amount GF_DILMTBS) to limit the cylinder injection amount, a maximum fuel amount that can be injected by the cylinder fuel injection valve in a specific crank angle period in a situation of the fuel pressure being a specific reference fuel pressure; a provisional injection end timing computation unit (ECU 2, step 33 in FIG. 5, FIG. 6) that computes, as a provisional injection end timing, an injection end timing assuming that the upper limit cylinder injection amount of fuel is being injected through the cylinder fuel injection valve, in a situation of the fuel pressure being the actual fuel pressure; and an upper limit cylinder injection amount correction unit (ECU 2, steps 34, 36, 37 in FIG. 5) that corrects the upper limit cylinder injection amount toward a decrease side when the computed provisional injection end timing is further to a lag angle side than the target injection end timing.

According to this configuration, the correction to decrease the cylinder injection amount based on the degree of drop in the actual fuel pressure is performed as follows. First, the maximum fuel amount that can be injected by the cylinder fuel injection valve in a specific crank angle period in a situation of the fuel pressure being the specific reference fuel pressure is computed as the upper limit cylinder injection amount. The upper limit cylinder injection amount is employed to limit the cylinder injection amount. Next, the injection end timing when the upper limit cylinder injection amount of fuel is being injected through the cylinder fuel injection valve, in a situation of the fuel pressure being the actual fuel pressure, is computed as the provisional injection end timing.

The provisional injection end timing computed in this manner expresses the injection end timing that is predicted assuming that the fuel is being injected at the upper limit cylinder injection amount when the actual fuel pressure has dropped. Accordingly, when the computed provisional injection end timing is further to the lag angle side than the target injection end timing, the upper limit cylinder injection amount is corrected toward the decrease side, thereby appropriately correcting the upper limit cylinder injection amount, such that the injection end timing does not become later than the target injection end timing. Moreover, the cylinder injection amount is limited by the corrected upper limit cylinder injection amount. Accordingly, the maximum cylinder injection amount can be secured within a range in which the injection end timing does not become later than the target injection end timing, and correction to decrease the cylinder injection amount can be performed appropriately.

A third aspect of the disclosure describes the internal combustion engine fuel injection control device of the second aspect, wherein the upper limit cylinder injection amount correction unit includes a flow rate ratio parameter computation unit (ECU 2, step 36 in the drawings) that computes a flow rate ratio parameter (target-to-actual fuel pressure correction coefficient KCMDACT) expressing a ratio of a fuel flow rate (target fuel pressure fuel flow rate QCMD) injected through the cylinder fuel injection valve for when the fuel pressure is the target fuel pressure against a fuel flow rate (actual fuel pressure fuel flow rate QACT) injected through the cylinder fuel injection valve for when the fuel pressure is the actual fuel pressure. The upper limit cylinder injection amount correction unit corrects the upper limit cylinder injection amount based on the computed flow rate ratio parameter (step 37 in FIG. 5).

The flow rate ratio computed as described above is a ratio between the target fuel pressure and the actual fuel pressure of the fuel flow rate of the cylinder fuel injection valve. Accordingly, this corresponds to the reciprocal of the ratio between the necessary lengths of time required to inject a given amount of fuel at the two fuel pressures. Accordingly, the flow rate ratio parameter expressing the fuel flow rate ratio is computed, and the upper limit cylinder injection amount is corrected based on this. This thereby enables correction of the upper limit cylinder injection amount, and thereby the correction to decrease the cylinder injection amount, to be performed appropriately according to the degree of drop in the fuel flow rate accompanying a drop in the actual fuel pressure.

A fourth aspect of the disclosure describes the internal combustion engine fuel injection control device of any of the first aspect to the third aspect, further including a target injection end timing setting unit (step 32 in FIG. 5) that sets the target injection end timing to immediately before a timing at which a combustion state inside the cylinder is predicted to become unstable.

As described above, in the disclosure according to the first to the third aspects, fuel injection by the cylinder fuel injection valve is controlled so as to end by the target injection end timing. Moreover, according to this configuration, the target injection end timing is set immediately before a timing at which the combustion state inside the cylinder is predicted to become unstable. This thereby enables the combustion state to be reliably prevented from becoming unstable.

A fifth aspect of the disclosure describes the internal combustion engine fuel injection control device of the fourth aspect, further including a revolution speed detection unit (crank angle sensor 22) that detects a revolution speed NE of the internal combustion engine. The target injection end timing setting unit sets the target injection end timing further toward an advanced angle side the higher the detected revolution speed of the internal combustion engine (step 32 in FIG. 5).

The higher the revolution speed of the internal combustion engine, the shorter the length of time for a given crank angle period, and therefore the shorter the length of time for combustion. Accordingly, combustion is liable to become unstable. According to this configuration, the target injection end timing is set further toward the advanced angle side the higher the revolution speed of the internal combustion engine, in order to end fuel injection earlier. This thereby enables instability of combustion accompanying an increase in the revolution speed to be reliably avoided.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel injection control device for an internal combustion engine in which fuel is supplied through a cylinder fuel injection valve that injects fuel inside a cylinder, and through a port fuel injection valve that injects fuel into an air intake port, the fuel injection control device comprising:
   a demanded fuel amount computation unit that computes a demanded fuel amount demanded by the internal combustion engine;
   a cylinder injection amount computation unit that computes a cylinder injection amount, this being an amount of fuel to be injected through the cylinder fuel injection valve;
   an actual fuel pressure detection unit that detects an actual value of pressure of fuel supplied to the cylinder fuel injection valve as an actual fuel pressure;
   a cylinder injection amount correction unit that, based on a degree of drop in the actual fuel pressure with respect to a target fuel pressure, this being a target value for the fuel pressure, corrects the cylinder injection amount toward a decrease side such that fuel injection through the cylinder fuel injection valve ends by a specific target injection end timing; and
   a port injection amount computation unit that computes a port injection amount, this being an amount of fuel to be injected through the port fuel injection valve, based on the computed demanded fuel amount and the corrected cylinder injection amount.

2. The fuel injection control device of claim 1, wherein the cylinder injection amount correction unit includes:

an upper limit cylinder injection amount computation unit that computes, as an upper limit cylinder injection amount to limit the cylinder injection amount, a maximum fuel amount that can be injected by the cylinder fuel injection valve in a specific crank angle period in a situation of the fuel pressure being a specific reference fuel pressure;

a provisional injection end timing computation unit that computes, as a provisional injection end timing, an injection end timing assuming that the upper limit cylinder injection amount of fuel is being injected through the cylinder fuel injection valve, in a situation of the fuel pressure being the actual fuel pressure; and an upper limit cylinder injection amount correction unit that corrects the upper limit cylinder injection amount toward a decrease side when the computed provisional injection end timing is further to a lag angle side than the target injection end timing.

3. The fuel injection control device of claim 2, wherein the upper limit cylinder injection amount correction unit:
includes a flow rate ratio parameter computation unit that computes a flow rate ratio parameter expressing a ratio of a fuel flow rate injected through the cylinder fuel injection valve for when the fuel pressure is the target fuel pressure against a fuel flow rate injected through the cylinder fuel injection valve for when the fuel pressure is the actual fuel pressure; and
corrects the upper limit cylinder injection amount based on the computed flow rate ratio parameter.

4. The fuel injection control device of claim 1, further comprising a target injection end timing setting unit that sets the target injection end timing to immediately before a timing at which a combustion state inside the cylinder is predicted to become unstable.

5. The fuel injection control device of claim 4, further comprising:
a revolution speed detection unit that detects a revolution speed of the internal combustion engine; wherein
the target injection end timing setting unit sets the target injection end timing further toward an advanced angle side the higher the detected revolution speed of the internal combustion engine.

6. A fuel injection control device for an internal combustion engine including a cylinder fuel injection valve to inject fuel inside a cylinder and a port fuel injection valve to inject fuel into an air intake port, the fuel injection control device comprising:
a fuel pressure sensor to detect an actual fuel pressure of the fuel supplied to the cylinder fuel injection valve; and
circuitry configured to
calculate a demanded amount of the fuel supplied to the internal combustion engine;
calculate a cylinder injection amount of fuel injected from the cylinder fuel injection valve;
correct the cylinder injection amount to decrease in accordance with a degree of drop in the actual fuel pressure comparing to a target fuel pressure of the fuel supplied to the cylinder fuel injection valve such that fuel injection from the cylinder fuel injection valve ends by a target injection end timing; and
calculate a port injection amount of the fuel injected from the port fuel injection valve based on the demanded fuel amount and the corrected cylinder injection amount.

7. The fuel injection control device of claim 6, wherein the circuitry is configured to
calculate, as an upper limit cylinder injection amount to limit the cylinder injection amount, a maximum fuel amount that is to be injected by the cylinder fuel injection valve in a specific crank angle period in a situation of the fuel pressure being a specific reference fuel pressure;
calculate, as a provisional injection end timing, an injection end timing assuming that the upper limit cylinder injection amount of fuel is being injected through the cylinder fuel injection valve, in a situation of the fuel pressure being the actual fuel pressure; and
correct the upper limit cylinder injection amount to decrease when the computed provisional injection end timing is further to a lag angle side than the target injection end timing.

8. The fuel injection control device of claim 7, wherein the circuitry is configured to
calculate a flow rate ratio parameter expressing a ratio of a fuel flow rate injected through the cylinder fuel injection valve for when the fuel pressure is the target fuel pressure against a fuel flow rate injected through the cylinder fuel injection valve for when the fuel pressure is the actual fuel pressure; and
correct the upper limit cylinder injection amount based on the computed flow rate ratio parameter.

9. The fuel injection control device of claim 6, wherein the circuitry is configured to set the target injection end timing to immediately before a timing at which a combustion state inside the cylinder is predicted to become unstable.

10. The fuel injection control device of claim 9, further comprising:
a revolution speed sensor to detect a revolution speed of the internal combustion engine, wherein
the circuitry is configured to set the target injection end timing further toward an advanced angle side the higher the detected revolution speed of the internal combustion engine.

11. A fuel injection control device for an internal combustion engine including a cylinder fuel injection valve to inject fuel inside a cylinder and a port fuel injection valve to inject fuel into an air intake port, the fuel injection control device comprising:
a fuel pressure sensor to detect an actual fuel pressure of the fuel supplied to the cylinder fuel injection valve;
a first calculator to calculate a demanded amount of the fuel supplied to the internal combustion engine;
a second calculator to calculate a cylinder injection amount of fuel injected from the cylinder fuel injection valve;
a third calculator to correct the cylinder injection amount to decrease in accordance with a degree of drop in the actual fuel pressure comparing to a target fuel pressure of the fuel supplied to the cylinder fuel injection valve such that fuel injection from the cylinder fuel injection valve ends by a target injection end timing; and
a fourth calculator to calculate a port injection amount of the fuel injected from the port fuel injection valve based on the demanded fuel amount and the corrected cylinder injection amount.

* * * * *